Patented Aug. 8, 1950

2,517,924

UNITED STATES PATENT OFFICE 2,517,924

PRODUCTION OF A LIGHT-FAST AZOIC PIGMENT

Maurice G. Powell, Bound Brook, N. J., assignor to American Cyanamid Company, New York, N. Y., a corporation of Maine No Drawing. Application November 10, 1947, Serial No. 785,191

5 Claims. (Cl. 260—181)

This invention relates to a new process of preparing an azoic pigment tetrazotized dianisidine and the orthophenetidide of 2,3-hydroxy naphthoic acid in a crystalline form in which its light fastness is enormously increased. The pigment has the formula:

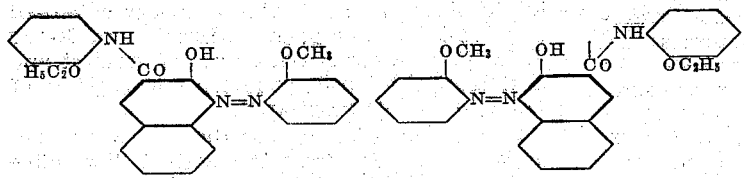

In the copending application of Lacey and Dombroski, Ser. No. 784,960, filed November 10, 1947, there has been described a method of preparing an azoic pigment from tetrazotized dianisidine and the orthophenetidide of 2,3-hydroxy naphthoic acid by coupling in the presence of certain cationic surface active agents. The product obtained shows a light fastness enormously greater than that of the pigment prepared by ordinary means, the increased fastness being of the order of magnitude from 5 to 10 times as great as the amorphous pigment.

The crystalline product referred to above has an X-ray diffraction spectrum characterized by the following bands:

| Interplanar Spacing Å. | Per Cent Intensity |
|---|---|
| 13.3 | 100 |
| 8.26 | 31 |
| 7.67 | 26 |
| 6.55 | 20 |
| 5.90 | 17 |
| 4.92 | 15 |
| 4.48 | 37 |
| 4.31 | 43 |
| 3.48 | 38 |
| 3.34 | 76 |
| 3.16 | 24 |

This form should not be confused with the crystalline form obtained by hot acid coupling in the absence of a cationic surface active agent, the X-ray diffraction spectrum of which is characterized by a line of maximum intensity at an interplanar crystal spacing of 9.2 Å., and a line of next greatest intensity at an interplanar spacing of 3.81 Å. This crystalline form has poor light fastness and is pseudomorph of crystals of the orthophenetidide of 2,3-hydroxy naphthoic acid.

According to the present invention I have found that the light fast crystalline form of the pigment described above may be prepared by heating a light unstable form of the pigment for a considerable period at a temperature above 100° C. When a light unstable pigment obtained from cold acid coupling in the absence of a cationic surface active agent is heat treated by the present invention, products which are identical with those obtained by the Lacey and Dombroski process result and the crystalline pigment is substantially free from light unstable forms. On the other hand, when the amorphous product which results from coupling in alkaline medium is heat treated sometimes only a portion of the pigment appears to be transformed into the light fast crystalline form described above which is characterized by an X-ray diffraction spectrum having its line of maximum intensity at 13.3 Å. at interplanar spacings with the second most intense line at an interplanar spacing at 3.34 Å.

The temperature is not critical and may vary widely. For example, a temperature as low as 105° C. gives good results, but temperatures below 100° C. are not satisfactory. The top limit on temperature is set by the stability of the products to high temperatures and by mechanical considerations. Satisfactory results have been obtained at as high a temperature as 200° C.

The time of heating is also not critical but should be long enough to effect the change in physical form of the pigment which appears to accompany its increased light fastness. The transformation to the light fast crystalline form described above is not instantaneous but requires a considerable period of heating. For small batches heating times of the order of several hours are satisfactory. Larger batches in some cases may require longer heating. In each case the skilled chemist will determine the minimum heating time for a particular batch size by tests on the product. Once determined the time cycle does not change so long as the batch size and temperature are the same.

Various methods of heating at temperatures above 100° C. may be employed. One good way is to heat in an autoclave and this is preferred. It is, however, also possible to heat at atmospheric pressure in an aqueous medium to which sufficient soluble salt, such as calcium chloride, has been added to raise the boiling point above 100° C.

When autoclaving is used it is desirable to have the autoclave surface of a material which does not react with the slurry. Nickel or glass lined autoclaves are satisfactory, but ordinary iron or steel autoclaves are not desirable as considerable decomposition results from the reaction of the iron with the pigment slurry.

The invention will be described in more detail in conjunction with the following specific examples, which represent typical embodiments of the invention. The parts are by weight.

*Example 1*

A batch of the pigment is prepared as follows: 6.55 parts of dianisidine are gradually wet with 700 parts of water using adequate mechanical agitation. 17.8 parts of 38% aqueous hydrochloric acid are added and the mixture stirred until the dianisidine is completely dissolved. The temperature is then lowered to 0° C. by the addition of ice and a 10% solution containing 7.8 parts sodium nitrite is rapidly added with vigorous stirring. The stirring is continued with rapid agitation at 0° C. until tetrazotization is complete.

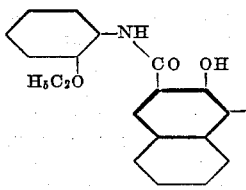

17.3 parts of orthophenetidide of 2,3-hydroxy naphthoic acid are wetted with 50 parts of water containing about 1% of a wetting agent. The wetting is continued until a paste is formed, whereupon another 50 parts of water are slowly added. The temperature is adjusted to 55° C. and 3.9 parts of sodium hydroxide in the form of a 20% solution are added. The product dissolves in the form of its sodium salt and 10 parts of sodium acetate are then added and the volume adjusted to 600 parts. Thereupon the temperature is brought down to 0° C. with ice and 10 parts of glacial acetic acid added with vigorous stirring. As soon as the coupling component has completely precipitated stirring is stopped.

Immediately after precipitation the coupling component is added to the tetrazotized dianisidine solution and stirred at 0° C. for several hours. Thereupon the reaction mixture is slowly heated up to 90° C., which temperature is maintained until coupling is complete.

The slurry is then placed in an autoclave which is preferably lined with nickel or glass and heated to 200° C. for several hours until the product shows the typical X-ray diffraction spectrum of the light fast crystalline form with lines of greatest and next greatest intensity at 13.3 and 3.34 Å. interplanar spacing, respectively. The autoclaved product shows a light fastness of 125 hours on the Fadeometer as compared to 40 hours for the product before autoclaving.

*Example 2*

To a slurry of the pigment prepared as described in Example 1 is added sufficient calcium chloride to raise the boiling point above 105° C. The slurry is then heated at this temperature for several hours until the pigment shows the X-ray diffraction spectrum of the light fast crystalline form. The pigment is then filtered, washed and dried in the customary manner, and shows a light fastness of 125 hours on the Fadeometer.

I claim:

1. A method of increasing the light fastness of an azoic pigment from tetrazotized dianisidine and the orthophenetidide of 2,3-hydroxy naphthoic acid having the formula:

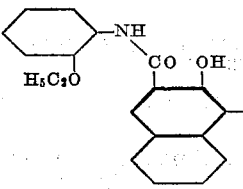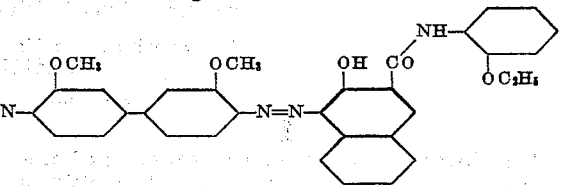

which comprises heating the pigment in an aqueous medium to a temperature above 100° C. and below the decomposition temperature of the pigment until the pigment has been transformed into a physical form having a greatly enhanced light fastness and characterized by an X-ray diffraction pattern having lines of greatest and next greatest intensity at interplanar spacings of 13.3 and 3.34 Å., respectively.

2. A method of increasing the light fastness of an azoic pigment from tetrazotized dianisidine and the orthophenetidide of 2,3-hydroxy naphthoic acid having the formula:

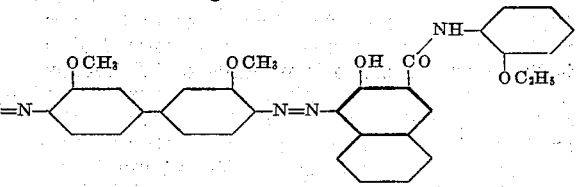

which comprises heating an aqueous slurry of the pigment to a temperature between 105–200° C. at superatmospheric pressure until the pigment has been transformed into a physical form having a greatly enhanced light fastness and characterized by an X-ray diffraction pattern having lines of greatest and next greatest intensity at interplanar spacings of 13.3 and 3.34 Å., respectively.

3. A method according to claim 1 in which salts are dissolved in the aqueous slurry to raise its boiling point above 100° C. and heating is effected at atmospheric pressure.

4. A method according to claim 1 in which the azoic pigment is obtained by coupling tetrazotized o-dianisidine and the orthophenetidide of 2,3-hydroxy naphthoic acid in acid medium, the pressure vessel having a noncorroding, nonferrous surface exposed to the aqueous slurry.

5. A method according to claim 2 in which the azoic pigment is obtained by coupling tetrazotized o-dianisidine and the orthophenetidide of 2,3-hydroxy naphthoic acid in acid medium, the pressure vessel having a noncorroding, nonferrous surface exposed to the aqueous slurry.

MAURICE G. POWELL.

REFERENCES CITED

The following references are of record in the file of this patent:

UNITED STATES PATENTS

| Number | Name | Date |
| --- | --- | --- |
| 2,261,626 | Lang | Nov. 4, 1941 |
| 2,294,306 | Lang | Aug. 25, 1942 |